(12) United States Patent
Kim et al.

(10) Patent No.: US 6,475,416 B2
(45) Date of Patent: Nov. 5, 2002

(54) METHOD FOR MANUFACTURING PLASTIC-SUBSTITUTE GOODS BY USING NATURAL MATERIALS

(75) Inventors: Young Bok Kim, 102-101, Mia Hyundai Apt., 190-2(6-5), Mia-dong, Kangbuk-ku, Seoul (KR); Myung Ja Kim, 102-101, Mia Hyundai Apt., 190-2(6-5), Mia-dong, Kangbuk-ku, Seoul (KR)

(73) Assignees: Young Bok Kim (KR); Myung Ja Kim (KR)

( * ) Notice: Subject to any disclaimer, the term of this patent is extended or adjusted under 35 U.S.C. 154(b) by 0 days.

(21) Appl. No.: 09/942,831

(22) Filed: Aug. 30, 2001

(65) Prior Publication Data

US 2002/0056937 A1 May 16, 2002

Related U.S. Application Data

(63) Continuation-in-part of application No. 09/611,096, filed on Jul. 6, 2000.

(51) Int. Cl.$^7$ ................................................. B27N 3/08
(52) U.S. Cl. ........................ 264/115; 524/15; 264/109
(58) Field of Search ................................. 264/115, 122, 264/109; 524/13, 15

(56) References Cited

U.S. PATENT DOCUMENTS

| 5,411,691 A | * | 5/1995 | Hwang | 264/115 |
| 6,306,324 B1 | * | 10/2001 | Wang | 264/109 |

FOREIGN PATENT DOCUMENTS

| CN | 1223280 | 7/1999 |
| DE | 19607962 C1 | 6/1997 |
| JP | 01 230672 A | 9/1989 |
| JP | 09 302145 A | 11/1997 |

* cited by examiner

*Primary Examiner*—Mary Lynn Theisen
(74) *Attorney, Agent, or Firm*—IP Strategies, P.C.

(57) ABSTRACT

A method for manufacturing plastic-substitute goods by using natural materials is disclosed. Agricultural byproducts and wood byproducts such as rice husks, rice plant stems, corn plant stems, bean plant stems, wheat plant stems, saw dust and the like are crushed into a particular size, then the crushed particles are mixed with natural adhesives (such as corn starch, potato starch and the like), and are coated with rosin or natural resins, and then a molding is carried out by applying a pressure in a molding machine, thereby manufacturing the plastic-substitute goods. The raw materials of the present invention are readily available from the rural areas, and the molding is carried out at a temperature of 100–300 degrees C.

7 Claims, 1 Drawing Sheet

METHOD FOR MANUFACTURING PLASTIC-SUBSTITUTE GOODS BY USING NATURAL MATERIALS

CROSS REFERENCE TO RELATED APPLICATION

This is a continuation-in-part of co-pending U.S. patent application Ser. No. 09/611,096, which was filed on Jul. 6, 2000.

FIELD OF THE INVENTION

The present invention relates to a method for manufacturing plastic-substitute goods by using natural materials. Particularly, the invention relates to a method for manufacturing plastic-substitute goods by using natural materials, in which agricultural byproducts and wood byproducts such as rice husks, rice plant stems, corn plant stems, bean plant stems, wheat plant stems, saw dust and the like are crushed into a particular size, then the crushed particles are mixed with natural adhesives (such as corn starch, potato starch and the like), and are coated with rosin or natural resins, and then a molding is carried out by applying a pressure in a molding machine, thereby manufacturing the plastic-substitute goods.

BACKGROUND OF THE INVENTION

There are various everyday goods which are made of plastic materials. Further, their shape and use are diversified, and have been continuously developed. However, the plastic materials are highly combustible, and therefore, in case of a fire accident, they are speedily burned off without allowing the fire fighting time. Further, when they are burned, toxic gases are generated to sacrifice human lives. When they are discarded, they are not decomposed, with the result that the natural environment is contaminated.

SUMMARY OF THE INVENTION

The present invention is intended to overcome the above described disadvantages of the conventional practice.

Therefore it is an object of the present invention to provide a method for manufacturing plastic-substitute goods by using natural materials, in which one or more materials are selected from among agricultural byproducts and wood byproducts such as rice husks, rice plant stems, corn plant stems, bean plant stems, wheat plant stems, saw dust and the like, then they are washed, sorted and dried, then they are mixed with natural adhesives such as corn starch, potato starch and the like, then they are dried and crushed, then they are mixed with a coating material such as rosin or a natural resin, and then, they are press-molded in a molding machine.

The agricultural byproducts and the wood byproducts can be selectively used, and the rice husks, rice plant stems and other plant byproducts can be mixedly used.

As the natural adhesive, there can be used corn starch and potato starch, but other cereal powder may be used to reap the same effect. Corn starch and potato starch are preferred because they are cheap. The substitute materials are crude in their touching sense and in the color, and therefore, they can be dyed.

Rosin is produced by removing terebinth oil from pine pitch, and therefore, it is combustion-resistant. Further, it is strengthened upon heating it, and is moisture-resistant.

Further, when molding the product of the present invention, the product can be easily separated from the molding die owing to the presence of rosin, and therefore, rosin is an important element in the present invention. In the present invention, the molding is carried out at a temperature of 100–350 degrees C., the internal pressure is preferably 5 Kg/Cm2, and the molding speed is 30–80 seconds per product.

The agricultural byproducts, the wood byproducts and other plant byproducts are mostly waste materials, and therefore, can be easily obtained. However, their availabilities are affected by seasons, and therefore, the most readily available materials in the season can be selectively used.

BRIEF DESCRIPTION OF THE DRAWINGS

The above object and other advantages of the present invention will become more apparent by describing in detail the preferred embodiment of the present invention with reference to the attached drawing in which.

DETAILED DESCRIPTION OF THE PREFERRED EMBODIMENTS

Figure 1:
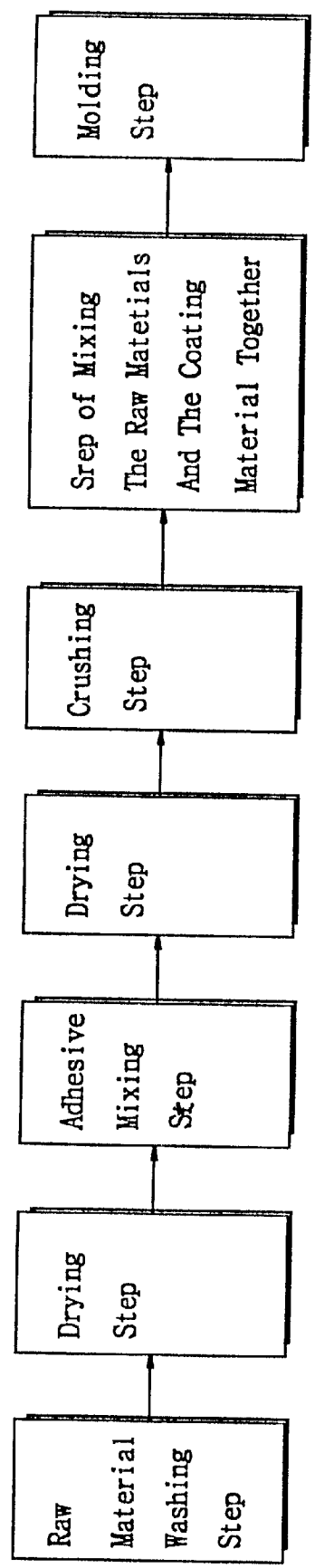
FIG. 1 illustrates the constitution of the manufacturing process according to the present invention.

The composition of the material of the present invention includes: one or more materials are selected from among agricultural byproducts such as rice husks, rice plant stems, corn plant stems, bean plant stems, wheat plant stems and the like, or wood byproducts such as saw dust and the like; natural adhesives such as corn starch, potato starch and the like; and a coating material such as rosin, and natural resins and the like.

The process for manufacturing the plastic-substitute goods by using natural materials according to the present invention includes: a material washing step; a washed material drying step; a step of dipping the dried materials into a glue; a step of drying the materials after the dipping into the glue; a step of crushing the dried materials; a step of mixing the crushed particles with a coating material; and a step of molding the mixed materials.

The chemical compositions of the materials of the present invention will be analyzed in detail below.

The patent application filed by present applicant on Jun. 18, 1999 and entitled "FOOD CONTAINER MADE OF NATURAL MATERIAL" was analyzed by the Korea Institute of Science and Technology as to its chemical composition. The chemical composition of the material of the present invention is similar to that of the above cited patent application.

Therefore, the data which were prepared by the Korea Institute of Science and Technology will be referred to.

Tables 1 and 2 analyze the ingredient materials which constitute the container made of rice husks; and analyze the substances which are generated when burning the container.

Experiment 1

TABLE 1

Analysis of the materials constituting the container

Analyzed items (unit :

| Test Piece | SiO2 | Mass Decrease at heating | Pb | Cd | As | Hg | Cu | |
|---|---|---|---|---|---|---|---|---|
| Material Test | 10.8 | 88.3 | 0.0005 or less | 0.00005 or less | 0.0005 or less | 0.000005 or less | 0.0011 | |
| (*) Unit | (I) wt % | WET wt % | AAS wt % | AAS wt % | ICP wt % | AAS wt % | AAS wt % | |
| Elution | KmnO4 consptn 1.5 | Phenols 0.047 | Formaldehyde 0.7 | Diazinon 0.001 or less | Parathion 0.001 or less | Carbaryl 0.005 or less | Fenitrothion 0.001 or less | Malathion 0.001 or less |
| (*) Unit | wet mg/l | sp mg/l | Sp Mg/l | gc mg/l | gc mg/l | gc mg/l | gc mg/l | gc mg/l |

In the above table, the heavy metals which are harmful to the human body are classified. Only silicon dioxide is 0.8 wt %, lead (Pb) is 0.0005 wt % or less, cadmium (Cd) is 0.00005 wt % or less, arsenic (As) is 0.0005 wt % or less, mercury (IIg) is 0.000005 wt % or less, copper (Cu) is 0.0011 or less. Thus the heavy metals are less than the standard values, and therefore, they cannot give toxicity to the human body. Silicon dioxide corresponds to the quartz sand, and therefore, it is not harmful to the human body at all probability. Therefore, the ingredient materials which constitute the material of the present invention are not harmful to the human body as can be seen in Table 1 above.

Table 2 below shows the measurements of the environment polluting materials by Chungyong Environment Co., Ltd. so as to see the environment polluting degrees of the substances which are generated during the burning of the container which is made of the rice husks.

Experiment 2

TABLE 2

Measurement of environment pollution during the burning

| Items | Standard | Measured result | Measuring method | RMKS |
|---|---|---|---|---|
| NH3 | 100 ppm | ND | Environment pollution test method | |
| CO | 600(12) ppm | 428.6 | " | |
| HCL | 50(12) ppm | 9.76 | " | |
| C12 | 60(12) ppm | 11.5 | " | |
| Sox | 300(12) ppm | ND | " | |
| NOX | 200 ppm | 62.0 | " | |
| CS2 | 30 ppm | 0.75 | " | |
| HCHO | 20 ppm | 3.3 | " | |
| H2S | 15 ppm | ND | " | |
| F | 3 ppm | ND | " | |
| HCN | 10 ppm | 2.44 | " | |
| Br | 5 ppm | ND | " | |
| C6H6 | 50 ppm | ND | " | |
| C6H5OH | 10 ppm | ND | " | |
| Hg | 5 mg/Sm$^3$ | ND | " | |
| As | 3 ppm | ND | " | |
| DUST | 100(12) mg/Sm$^3$ | 13.5 | " | |
| Cd | 1.0 mg/Sm$^3$ | 0.003 | " | |
| Pb | 5.0 mg/Sm$^3$ | 0.014 | " | |
| Cr | 1.0 mg/Sm$^3$ | 0.118 | " | |
| Cu | 10 mg/Sm$^3$ | ND | " | |
| Ni | 20 mg/Sm$^3$ | 0.044 | " | |
| Zn | 30 mg/Sm$^3$ | 0.48 | " | |
| O2 | — | 5.4% | " | |

* The combustion rate was 81.5%.

As can be seen in Table 2 above, the density of the containers was high, and therefore, carbon monoxide (CO) was slightly generated during the burning. However, it was far short of the standard pollution value, and therefore, the container is a non-polluting material as can be seen in Tables 1 and 2 above.

Therefore, as can be seen in the comparison of Tables 1 and 2, the materials of the present invention are also non-polluting materials.

Now the method for manufacturing the plastic-substitute goods by using the natural materials according to the present invention will be described based on actual examples.

EXAMPLE 1

Rice husks were washed to a clean state. The rice husks thus washed were dried to a drying degree of 98%.

Meanwhile, 20 wt % of a starch was mixed with 80 wt % of water. This mixture was agitated, so that the starch and water could be uniformly mixed.

After the confirmation of the agitation result, an aging was carried out while slowly heating the mixture up to 100 degrees C. in such a manner that the mixture would not be burned. When the mixture of the starch and water was heated, it became glue.

It was made sure that the glue would not be agglomerated, and thus, the required viscosity of the glue was maintained.

The dried rice husks were mixed with the glue, and then, an agitation was carried out, so that the rice husks would be completely mixed with the glue.

When it was confirmed that the rice husks and the glue were sufficiently mixed together, the mixture was dried to a drying degree of 98%. Here, the proportion of the starch glue was 20 wt %, while that of the rice husks was 80 wt %. After drying the mixture, it was crushed to a size range of 0.01 mm–0.1 mm.

Then 85 wt % of the husk-starch mixture was mixed with 15 wt % of rosin or another natural resin. Then 85 wt % of this mixture (hust-starch-rosin) was mixed again with 15 wt % of water. Then this final mixture was molded by a molding machine at a temperature of 100–350 degrees C. and at a pressure of 5 Kg/Cm2. The product was molded at a frequency of 30–80 seconds.

EXAMPLE 2

Rice plant stems were cut to a certain length (3–5 cm). Then the cut stems were cleanly washed. The washed stems were dried to drying degree of 98%.

Meanwhile, 20 wt % of a starch was mixed with 80 wt % of water. This mixture was agitated, so that the starch and water could be uniformly mixed.

After the confirmation of the agitation result, an aging was carried out while slowly heating the mixture up to 100 degrees C. in such a manner that the mixture would not be burned. When the mixture of the starch and water was heated, it became glue.

It was made sure that the glue would not be agglomerated, and thus, the required viscosity of the glue was maintained.

The dried rice plant stems were mixed with the glue, and then, an agitation was carried out, so that the rice plant would be completely mixed with the glue.

When it was confirmed that the rice plant and the glue were sufficiently mixed together, the mixture was dried to a drying degree of 98%. Here, the proportion of the starch glue was 20 wt %, while that of the rice plant was 80 wt %. After drying the mixture, it was crushed to a size range of 0.01 mm–0.1 mm.

Then 85 wt % of the rice plant-starch mixture was mixed with 15 wt % of rosin or another natural resin. Then 85 wt % of this mixture (rice plant-starch-rosin) was mixed again with 15wt % of water. Then this final mixture was molded by a molding machine at a temperature of 100–350 degrees C. and at a pressure of 5 Kg/Cm2. The product was molded at a frequency of 30–80 seconds per product.

EXAMPLE 3

Saw dusts were cleanly washed. Then the washed saw dusts were dried to a drying degree of 98%.

Meanwhile, 20 wt % of a starch was mixed with 80 wt % of water. This mixture was agitated, so that the starch and water could be uniformly mixed.

After the confirmation of the agitation result, an aging was carried out while slowly heating the mixture up to 100 degrees C. in such a manner that the mixture would not be burned. When the mixture of the starch and water was heated, it became glue.

It was made sure that the glue would not be agglomerated, and thus, the required viscosity of the glue was maintained.

The dried saw dusts were mixed with the glue, and then, an agitation was carried out, so that the sawdust would be completely mixed with the glue.

When it was confirmed that the sawdust and the glue were sufficiently mixed together, the mixture was dried to a drying degree of 98%. Here, the proportion of the starch glue was 20 wt %, while that of the sawdust was 80 wt %. After drying the mixture, it was crushed to a size range of 0.01 mm–0.1 mm.

Then 85 wt % of the saw dust-starch mixture was mixed with 15 wt % of rosin or another natural resin. Then 85 wt % of this mixture (saw dust-starch-rosin) was mixed again with 15wt % of water. Then this final mixture was molded by a molding machine at a temperature of 100–350 degrees C. and at a pressure of 5 Kg/Cm2. The product was molded at a frequency of 30–80 seconds per product.

EXAMPLE 4

Corn plant stems were cut into a length range of 3–5 cm. Then the cut corn plant stems were cleanly washed, and then, the washed corn plant stems were dried to a drying degree of 98%.

Meanwhile, 20 wt % of a starch was mixed with 80 wt % of water. This mixture was agitated, so that the starch and water could be uniformly mixed. That is, the agitation was carried out while visually checking the mixing degree.

After the confirmation of the agitation result, an aging was carried out while slowly heating the mixture up to 100 degrees C. in such a manner that the mixture would not be burned. When the mixture of the starch and water was heated, it became glue.

It was made sure that the glue would not be agglomerated, and thus, the required viscosity of the glue was maintained.

The dried corn plant stems were mixed with the glue, and then, an agitation was carried out, so that the corn plant stems would be completely mixed with the glue.

When it was confirmed that the corn plant stems and the glue were sufficiently mixed together, the mixture was dried to a drying degree of 98%. Here, the proportion of the starch glue was 20 wt %, while that of the corn plant stems was 80 wt %. After drying the mixture, it was crushed to a size range of 0.01 mm–0.1 mm.

Then 85 wt % of the corn plant-starch mixture was mixed with 15 wt % of rosin or another natural resin. Then 85 wt % of this mixture (corn plant-starch-rosin) was mixed again with 15 wt % of water. Then this final mixture was molded by a molding machine at a temperature of 100–350 degrees C. and at a pressure of 5 Kg/Cm2. The product was molded at a frequency of 30–80 seconds per product.

EXAMPLE 5

Wheat plant stems were cut into a size range of 3–5 cm. Then the cut wheat plant stems were cleanly washed, and the washed wheat plant stems were dried to a drying degree of 98%.

Meanwhile, 20 wt % of a starch was mixed with 80 wt % of water. This mixture was agitated, so that the starch and water could be uniformly mixed. That is, the agitation was carried out while visually checking the mixing degree.

After the confirmation of the agitation result, an aging was carried out while slowly heating the mixture up to 100 degrees C. in such a manner that the mixture would not be burned. When the mixture of the starch and water was heated, it became glue.

It was made sure that the glue would not be agglomerated, and thus, the required viscosity of the glue was maintained.

The dried wheat plant stems were mixed with the glue, and then, an agitation was carried out, so that the wheat plant stems would be completely mixed with the glue.

When it was confirmed that the wheat plant stems and the glue were sufficiently mixed together, the mixture was dried to a drying degree of 98%. Here, the proportion of the starch glue was 20 wt %, while that of the wheat plant stems was 80 wt %. After drying the mixture, it was crushed to a size range of 0.01 mm–0.1 mm.

Then 85 wt % of the wheat plant-starch mixture was mixed with 15 wt % of rosin or another natural resin. Then 85 wt % of this mixture (wheat plant-starch-rosin) was mixed again with 15 wt % of water. Then this final mixture was molded by a molding machine at a temperature of 100–350 degrees C. and at a pressure of 5 Kg/Cm2. The product was molded at a frequency of 30–80 seconds per product.

EXAMPLE 6

Bean plant stems were cut into a size range of 3–5 cm. Then the cut bean plant stems were cleanly washed, and the washed bean plant stems were dried to a drying degree of 98%.

Meanwhile, 20 wt % of a starch was mixed with 80 wt % of water. This mixture was agitated, so that the starch and water could be uniformly mixed. That is, the agitation was carried out while visually checking the mixing degree.

After the confirmation of the agitation result, an aging was carried out while slowly heating the mixture up to 100 degrees C. in such a manner that the mixture would not be burned. When the mixture of the starch and water was heated, it became glue.

It was made sure that the glue would not be agglomerated, and thus, the required viscosity of the glue was maintained.

The dried bean plant stems were mixed with the glue, and then, an agitation was carried out, so that the bean plant stems would be completely mixed with the glue.

When it was confirmed that the bean plant stems and the glue were sufficiently mixed together, the mixture was dried to a drying degree of 98%. Here, the proportion of the starch glue was 20 wt %, while that of the bean plant stems was 80 wt %. After drying the mixture, it was crushed to a size range of 0.01 mm–0.1 mm.

Then 85 wt % of the bean plant-starch mixture was mixed with 15 wt % of rosin or another natural resin. Then 85 wt % of this mixture (bean plant-starch-rosin) was mixed again with 15 wt % of water. Then this final mixture was molded by a molding machine at a temperature of 100–350 degrees C. and at a pressure of 5 Kg/Cm2. The product was molded at a frequency of 30–80 seconds per product.

EXAMPLE 7

After abstracting the alcoholic spirit out of the barley, there remains sludge of the alcoholic beverages factory. This sludge consists of barley husks and other substances. This sludge may be the reason of pollution. We use these barley husks in the invention to decrease the environment contamination.

The barley husks chosen out of sludge were cleanly washed, and the washed barley husks were dried to a drying degree of 98%.

Meanwhile, 20 wt % of a starch was mixed with 80 wt % of water. This mixture was agitated, so that the starch and water could be uniformly mixed. That is, the agitation was carried out while visually checking the mixing degree.

After the confirmation of the agitation result, an aging was carried out while slowly heating the mixture up to 100 degrees C. in such a manner that the mixture would not be burned. When the mixture of the starch and water was heated, it became glue.

It was made sure that the glue would not be agglomerated, and thus, the required viscosity of the glue was maintained.

The dried barley husks were mixed with the glue, and then, an agitation was carried out, so that the barley husks would be completely mixed with the glue.

When it was confirmed that the barley husks and the glue were sufficiently mixed together, the mixture was dried to a drying degree of 98%. Here, the proportion of the starch glue was 20 wt %, while that of the barley husks was 80 wt %. After drying the mixture, it was crushed to a size range of 0.01 mm–0.1 mm.

Then 85 wt % of the barley husks-starch mixture was mixed with 15 wt % of rosin or another natural resin. Then 85 wt % of this mixture (barley husks-starch-rosin) was mixed again with 15 wt % of water. Then this final mixture was molded by a molding machine at a temperature of 100–350 degrees C. and at a pressure of 5 Kg/Cm2. The product was molded at a frequency of 30–80 seconds per product.

In the above, as to the crushed size of the agricultural byproducts such as rice husks, saw dusts, rice plant stems, corn plant stems, wheat plant stem, bean plant stem, [barley husks] and the like, sizes of less than 0.01 mm or more than 0.1 mm are possible. If the raw material is a plant, any kind will be possible. Further, rice husks, saw dusts, rice plant stems, corn plant stems, wheat plant stem, bean plant stem and the like can be combinedly used depending on the needs or on the use.

According to the present invention as described above, the raw materials are readily available ones, and therefore, the substitution effects will be great. Further, the raw materials are mostly combustible, but owing to the strong pressing during the molding, the product is not easily burned. Even if the product is burned, toxic gases will not be generated, and the flame will be of a low temperature kind. Therefore, in the case of a fire accident, the product will not contribute to the worsening of the catastrophe.

What is claimed is:

1. A method for manufacturing plastic-substitute goods by using natural materials, comprising the steps of:
   preparing a glue by mixing 20 wt % of a starch and 80 wt % of water together, and by heating this mixture;
   washing and drying rice husks to a drying degree of 98%;
   mixing the glue and the rice husks together so as to form a mixture of the glue and the rice husks, drying them to a drying degree of 98%, and crushing them to a size range of 0.01–0.1 mm;
   mixing 85 wt % of the mixture of the glue and the rice husks and 15 wt % of rosin, and then mixing again 85 wt % of this whole mixture with 15 wt % of water to form a final mixture; and
   molding the final mixture by a molding machine at a temperature of 100–350 degrees C. under a pressure of 5 Kg/Cm2 at a production frequency of 30–80 seconds per product.

2. A method for manufacturing plastic-substitute goods by using natural materials, comprising the steps of:

preparing a glue by mixing 20 wt % of a starch and 80 wt % of water together, and by heating this mixture;

cutting rice plant stems into 3–5 cm, and washing and drying the rice plant stems to a drying degree of 98%;

mixing the glue and the rice plant stems together so as to form a mixture of the glue and the rice plant stems, drying them to a drying degree of 98%, and crushing them to a size range of 0.01–0.1 mm;

mixing 85 wt % of the mixture of the glue and the rice plant and 15 wt % of rosin, and then mixing again 85 wt % of this whole mixture with 15 wt % of water to form a final mixture; and molding the final mixture by a molding machine at a temperature of 100–350 degrees C. under a pressure of 5 Kg/Cm2 at a production frequency of 30–80 seconds per product.

3. A method for manufacturing plastic-substitute goods by using natural materials, comprising the steps of:

preparing a glue by mixing 20 wt % of a starch and 80 wt % of water together, and by heating this mixture;

washing and drying saw dusts to a drying degree of 98%;

mixing the glue and the saw dusts together so as to form a mixture of the glue and the saw dusts, drying them to a drying degree of 98%, and crushing them to a size range of 0.01–0.1 mm;

mixing 85 wt % of the mixture of the glue and the saw dust and 15 wt % of rosin, and then mixing again 85 wt % of this whole mixture with 15 wt % of water to form a final mixture; and molding the final mixture by a molding machine at a temperature of 100–350 degrees C. under a pressure of 5 Kg/Cm2 at a production frequency of 30–80 seconds per product.

4. A method for manufacturing plastic-substitute goods by using natural materials, comprising the steps of:

preparing a glue by mixing 20 wt % of a starch and 80 wt % of water together, and by heating this mixture;

cutting corn plant stems into 3–5 cm, and washing and drying the corn plant stems to a drying degree of 98%;

mixing the glue and the corn plant stems together so as to form a mixture of the glue and the corn plant stems, drying them to a drying degree of 98%, and crushing them to a size range of 0.01–0.1 mm;

mixing 85 wt % of the mixture of the glue and the corn plant stems and 15 wt % of rosin, and then mixing again 85 wt % of this whole mixture with 15 wt % of water to form a final mixture; and molding the final mixture by a molding machine at a temperature of 100–350 degrees C. under a pressure of 5 Kg/Cm2 at a production frequency of 30–80 seconds per product.

5. A method for manufacturing plastic-substitute goods by using natural materials, comprising the steps of:

preparing a glue by mixing 20 wt % of a starch and 80 wt % of water together, and by heating this mixture;

cutting wheat plant stems into 3–5 cm, and washing and drying the wheat plant stems to a drying degree of 98%;

mixing the glue and the wheat plant stems together so as to form a mixture of the glue and the wheat plant stems, drying them to a drying degree of 98%, and crushing them to a size range of 0.01–0.1 mm;

mixing 85 wt % of the mixture of the glue and the wheat plant stems and 15 wt % of rosin, and then mixing again 85 wt % of this whole mixture with 15 wt % of water to form a final mixture; and molding the final mixture by a molding machine at a temperature of 100–350 degrees C. under a pressure of 5 Kg/Cm2 at a production frequency of 30–80 seconds per product.

6. A method for manufacturing plastic-substitute goods by using natural materials, comprising the steps of:

preparing a glue by mixing 20 wt % of a starch and 80 wt % of water together, and by heating this mixture;

cutting bean plant stems into 3–5 cm, and washing and drying the bean plant stems to a drying degree of 98%;

mixing the glue and the bean plant stems together so as to form a mixture of the glue and the bean plant stems, drying them to a drying degree of 98%, and crushing them to a size range of 0.01–0.1 mm;

mixing 85 wt % of the mixture of the glue and the bean plant stems and 15 wt % of rosin, and then mixing again 85 wt % of this whole mixture with 15 wt % of water to form a final mixture; and molding the final mixture by a molding machine at a temperature of 100–350 degrees C. under a pressure of 5 Kg/Cm2 at a production frequency of 30–80 seconds per product.

7. A method for manufacturing plastic-substitute goods by using natural materials, comprising the steps of:

preparing a glue by mixing 20 wt % of a starch and 80 wt % of water together, and by heating this mixture;

extracting barley husks out of the washed sludge produced from the alcoholic factory and washing and drying the barley husks to a drying degree of 98%;

mixing the glue and the barley husks together so as to form a mixture of the glue and the bean plant stems, drying them to a drying degree of 98%, and crushing them to a size range of 0.01–0.1 mm;

mixing 85 wt % of the mixture of the glue and the barley husks and 15 wt % of rosin, and then mixing again 85 wt % of this whole mixture with 15 wt % of water to form a final mixture; and molding the final mixture by a molding machine at a temperature of 100–350 degrees C. under a pressure of 5 Kg/Cm$^2$ at a production frequency of 30–80 seconds per product.

* * * * *